3,780,010
METAL-COBALT CARBONYL COMPLEXES
James H. Tsai, Sarnia, Ontario, and Glenn H. Anderson, Corunna, Ontario, Canada, assignors to The Dow Chemical Company, Midland, Mich.
No Drawing. Original application June 22, 1970, Ser. No. 48,486. Divided and this application Apr. 3, 1972, Ser. No. 240,842
Int. Cl. C08d 3/04, 3/06
U.S. Cl. 260—94.3    5 Claims

ABSTRACT OF THE DISCLOSURE

Complexes of metal-cobalt carbonyl moiety represented by the empirical formula, $\{X_{y-n}(A)_zM[Co(CO)_4]_n\}$, wherein, for example, X is bromine, A is tetrahydrofuran, M is tin, y is 4, z is an average number of 0.5 to 1, and n is 2 are provided by reacting lower metal halide such as tin dibromide with octacarbonyldicobalt in the presence of tetrahydrofuran. The complexes are useful catalysts in the polymerization of olefins such as norbornadiene.

---

This is a division of application Ser. No. 48,486, filed June 22, 1970.

BACKGROUND OF THE INVENTION

This invention relates to a new class of organo-cobalt materials, and more particularly, to multinuclear, metal-cobalt carbonyl complexes.

Multinuclear, crystalline, cobalt-carbonyl complexes of the type, $X_{4-n}M[Co(CO)_4]_n$, wherein X is Cl, Br or I, M is Sn or Ge and n is 2 or 3 and methods for the preparation thereof have been reported by Patmore et al. in Inorganic Chemistry, vol. 5 (1966) at p. 2222 and vol. 6 (1967) at p. 981. Such complexes are generally soluble in non-polar organic liquids such as n-pentane.

Heretofore complexes of multinuclear, metal-cobalt-carbonyl complexes, which materials are generally insoluble in non-polar organic liquids, have not been known.

SUMMARY OF THE INVENTION

In accordance with the present invention, there are provided complexes, often in the form of non-crystalline, gum-like materials, comprising metal-cobalt carbonyl moiety represented by the empirical formula

wherein X is a ligand with the proviso that at least one ligand represented by X is chloro, bromo, nitro, nitrato, sulfato, acetylacetonato, or iodo, A is a polar organic solvent molecule having at least one unshared pair of electrons, M is a metal of Groups 3a and 4a of the Periodic Table of Elements, Handbook of Chemistry and Physics, 48th ed., Chemical Rubber Company (1967–68), y is 3 when M is 3a metal and 4 when M is 4a metal, z is an average number from about 0.5 to about 1, and n is 1 or 2 when M is 3a metal and 1, 2 or 3 when M is a 4a metal. These complexes are readily prepared by reacting octa-carbonyldicobalt with metal halide in polar organic solvent having at least one unshared pair of electrons per solvent molecule.

The complexes of the present invention are extremely useful catalysts in the steroregular dimerization of bicyclic dienes such as norbornadiene [bicyclo(2.2.1)hepta-2,5-diene], in the disproportionation of cyclic compounds, e.g., 1,3-cyclohexadiene to benzene and cyclohexene and in the polymerization of other olefins, e.g., allene. Such complexes may also be employed as chemical intermediates in the preparation of other metal-cobalt carbonyl complexes.

DESCRIPTION OF THE PREFERRED EMBODIMENTS

The novel complexes of the present invention have structures of such complicacy that an absolute chemical structure cannot be readily assigned to them. Such complexes are therefore broadly defined as normally non-volatile, compositions of multinuclear, metalcobalt carbonyl moiety, said moiety having the general empirical formula $\{X_{y-n}(A)_zM[Co(CO)_4]_n\}$ wherein X, A, M, y, z and n are as generally defined hereinbefore and X, A and M as more specifically defined hereinafter. In most instances the novel complexes are non-crystalline gum-like materials which are defined as amorphous substances which are not crystallized in solvent even at high concentrations and low temperatures. In some instances, however, the complexes exist in more solid form. By "multinuclear, metal-cobalt carbonyl moiety" is meant an organo-metallic component wherein (1) there are at least two metal atoms including cobalt, (2) there are metal-cobalt bonds and (3) there are carbonyl groups bonded to cobalt. The complexes are further characterized as being generally soluble in polar organic solvents such as tetrahydrofuran, diethyl ether, methylene chloride and the like and generally insoluble in non-polar organic solvents such as n-pentane. While absolute chemical structures cannot be assigned to these complexes and therefore the invention should not be limited by the following theory, it is believed that said complexes are polymers having from 2 to 5 repeating units represented by the aforementioned empirical formula. However, it is understood that such complexes may also contain one or more than 5 units corresponding to the empirical formula. On the basis of Mössbauer and infrared spectroscopy and simple chemical tests, it is believed that the metal, when M is 4a, exists in a six-coordinate octahedral state wherein each metal atom, M, is bonded, by coordinate bonds or otherwise, to the cobalt atom(s) of cobalt tetracarbonyls, the halogen atoms(s), and the solvent molecule having an unshared pair of electrons. It is further believed that the repeating units of the polymer are linked in the following manner:

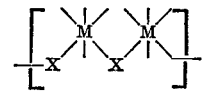

such that most of the halogen atoms of such polymer are not exposed to attack by nucleophile, e.g., a silver(I) ion.

More particularly, X represents both organic and inorganic ligands with the proviso that at least one ligand represented by X is chloro, bromo, nitro, nitrato, sulfato, acetylacetonato, or iodo, preferably chloro or bromo. Other ligands which may also be present include fluoro, alkyl such as methyl, aryl such as phenyl and substituted alkyls and aryls, and the like. In defining X, it is to be understood that X can represent one ligand provided that ligand is chloro, bromo, nitro, nitrato, sulfato, acetylacetonato, or iodo and that X can represent more than one ligand in which one or more ligands are one or more of the required ligands and the remaining ligand or ligands are selected from the other ligands described hereinbefore.

More specifically, M is a metal of Group 3a or 4a of the Periodic Table of Elements. Illustratively, M includes tin, germanium, silicon, lead, aluminum, gallium, indium, and thallium, preferably tin and germanium.

Specifically, A is a polar organic liquid molecule having an atom capable of forming a coordinate bond with the metal M.

For example, oxygen, sulfur and nitrogen atoms in the molecular structure of the polar organic liquid generally exhibit this characteristic. Exemplary polar organic liquid suitable for this purpose include the alcohols, e.g., methanol, ethanol, isopropanol, n-butanol, etc.; glycols, e.g., ethylene glycol, propylene glycol, etc.; cyclic and acyclic ethers, e.g., tetrahydrofuran, diethyl ether, 2-methoxyethyl ether, ethylene glycol dimethyl ether, ethylene glycol diethyl ether, etc.; ketones and aldehydes, e.g., acetone, methylethyl ketone, diethyl ketone, 2-hexanone, cyclohexanone, acetaldehyde, propionaldehyde, etc.; thiols and thioethers, e.g., methyl mercaptan, ethyl mercaptan, dimethyl sulfide, diethyl sulfide, etc.; amines having fairly low volatility, e.g., dimethylamine, ethylamine, diethylamine, triethylamine, propylamine, hexylamine, ethylenediamine, diethanolamine, aniline, pyridine, etc.; amides, e.g., formamide, dimethylformamide, etc.; carboxylic acids and anhydrides, e.g., formic acid, acetic acid, propionic acid, acetic anhydride, propionic anhydride, n-butyric acid and the like.

The polar organic liquid molecules are present in the novel complexes of this invention in average number of about 0.5 to about 1 per metal-cobalt carbonyl moiety as represented by $z$. It is understood, however, that the average number does not actually relate to any individual metal-cobalt carbonyl moiety but to an averaged moiety. While, for the sake of simplicity, specific examples of the novel complexes are set forth hereinafter and are described as having one molecule of polar liquid molecule per metal-cobalt carbonyl moiety, it is understood that the average number of polar liquid molecules per averaged metal-cobalt carbonyl moiety can be from about 0.5 to about 1.

Representative multinuclear, metal-cobalt carbonyl moieties, as set forth empirically, include $\{Cl_2(tetrahydrofuran)Sn[Co(CO)_4]_2\}$,
$\{Br_2(tetrahydrofuran)Sn[Co(CO)_4]_2\}$,
$\{Cl(tetrahydrofuran)Sn[Co(CO)_4]_3\}$,
$\{Br_2(diethyl\ ether)Sn[Co(CO)_4]_3\}$,
$\{Br_2(acetone)Sn[Co(CO)_4]_2\}$,
$\{Br(tetrahydrofuran)Sn[Co(CO)_4]_3\}$,
$\{ClF(tetrahydrofuran)Sn[Co(CO)_4]_2\}$,
$\{Br_2(methyl\ alcohol)Sn[Co(CO)_4]_2\}$,
$\{I_2(tetrahydrofuran)Sn[Co(CO)_4]_2\}$,
$\{Br_2(acetaldehyde)Ge[Co(CO)_4]_2\}$,
$\{Br(trimethylamine)Ga[Co(CO)_4]_2\}$,
$\{Br(methylmercaptan)Tl[Co(CO)_4]_2\}$,
$\{Cl(dimethylsulfide)In[Co(CO)_4]_2\}$,
$\{Br_2(acetamide)Pb[Co(CO)_4]_2\}$,
$\{Br_2(tetrahydrofuran)Si[Co(CO)_4]_3\}$,
$\{(O_4S)_2(dimethylformamide)Sn[Co(CO)_4]_2\}$,
$\{(O_3N)_2(dimethylamine)Pb[Co(CO)_4]_2\}$,
$\{(O_2N)_2(methyl$-$ethyl\ ketone)Sn[Co(CO)_4]_2\}$, $$\{(CH_3COCH_2\overset{O}{\overset{\|}{C}}CH_2O)Ge[Co(CO)_4]_3\}$$

and the like.

The complexes of the present invention are advantageously prepared by reaction of metal compound, $MX_m$ wherein M and X are as defined hereinbefore and $m$ is 1–4 for $4a$ metals and 1–3 for $3a$ metals, preferably 2 for $4a$ and 3 for $3a$, with octacarbonyldicobalt in a polar organic liquid solvent as defined hereinbefore. The concentration of total reactants in the solvent can vary from about 5 to about 80 weight percent, preferably from 15 to 35 weight percent, with the molar ratio of $MX_m$ to octacarbonyldicobalt varying from about 5:1 to about 0.1:1, preferably from 2:1 to 1:1. For example, as the molar ratio of $MX_m$ to octacarbonyldicobalt is varied from 2:1 to 0.5:1, $n$ of $\{X_{4-n}(A)M[Co(CO)_4]_n\}$ varies from 2 to about 3. In preparing the complexes, the order of addition of reactants is not critical; beneficially however, it is desirable to add solid octacarbonyldicobalt to $MX_m$ in the solvent defined hereinbefore. It is also possible to prepare these complexes in rather low yield by adding metal halide, $MX_m$, to sodium tetracarbonylcobaltate(1-), $Na[Co(CO)_4]$. Reaction can be carried out at temperature and pressure in the range of from about −40 to about 100° C. and from about the vapor pressure of the solvent to about 100 atmospheres, respectively, preferably from 0° to 30° C. and from 0.5 to 1.5 atmospheres. The period of reaction varies in dependence on the conditions employed from about 1 minute to about 24 hours, with the reaction being essentially complete after 30 minutes to one hour when preferred conditions are employed. The reaction can be executed in a batch, semi-continuous, or continuous fashion. The reaction vessel can be a glass vessel, steel autoclave, elongated metallic tube, or other equipment and material employed in the art provided that such equipment is able to withstand the rigors of the reaction and that the reactants and products are not sensitive to this material of construction.

The novel complexes of the present invention are readily recovered by withdrawing the crude product, usually in the form of a dark colored viscous oil, from the remaining reaction mixture and then dissolving the complex in a minimum amount of polar organic solvent, e.g., methylene chloride, and precipitating the complex by addition of non-polar organic solvent, e.g., n-pentane. Thus recovered, the complex is ready to be used as a catalyst in the polymerization of various olefins.

For example, the complexes of the present invention are particularly useful catalysts in the stereospecific dimerization of norbornadiene to form endo-cis-endo-hepta-cyclo[$5.3.1.1^{2,6}.1^{4,12}.1^{9,11}.0^{3,5}.0^{8,10}$]tetradecane having the structure

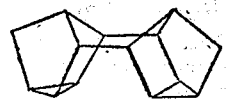

and hereinafter referred to as Binor-S. In carrying out such stereospecific dimerization process, norbornadiene or substituted norbornadiene is contacted with the complex catalyst, preferably under an inert atmosphere such as nitrogen. Dimerization is suitably carried out at temperatures ranging from about 0° to 100° C., preferably from 40° to 80° C., and at pressures ranging from atmospheric to 100 atmospheres. The ratio of catalyst complex to norbornadiene or substituted norbornadiene employed ranges from about 0.01 to about 100 parts by weight of catalyst complex per 100 parts by weight of norbornadiene, preferably from 1 to 10 parts of complex per 100 parts of norbornadiene. The dimerization period varies from about one minute to about 48 hours depending on the amount and species of catalyst, temperature and the like. Under the above specified conditions, more than 90 weight percent of norbornadiene dimer formed is Binor-S. Binor-S is particularly useful as a fuel additive and as a chemical intermediate for the preparation of other useful compounds.

Similar conditions can be employed for the polymerization of other olefins such as allene and butadiene. A catalytic amount of the complex in such polymerization also varies from about 0.01 to about 100 parts by weight per 100 parts by weight oleolefin. It is also understood that the novel complexes of this invention catalyze the copolymerization of various olefins under similar conditions.

The following examples are given to illustrate the invention and should not be construed as limiting its scope. All parts and percentages are by weight unless otherwise indicated.

EXAMPLE 1

In Run No. 1–1, a 5.1-g. portion (18.3 mmoles) of purified octacarbonyldicobalt is mixed with 6.04 g. (17.7 mmoles) of tin dibromide in 125 ml. of tetrahydrofuran (THF) under nitrogen atmosphere for one-half hour at 25° C. Octacarbonyldicobalt is purified by (1) dissolving 40 g. thereof in 250 ml. of methylene chloride under a carbon monoxide atmosphere, (2) passing the solution through a filter funnel using positive carbon monoxide pressure, (3) cooling the filtrate at −78° C. for 3 hours, (4) removing the resulting octacarbonyldicobalt (orange crystals) and (5) drying the octacarbonyldicobalt by suction and storing under carbon monoxide. The tetrahydrofuran is removed with a flow of carbon monoxide gas through the reaction vessel. The residue is evacuated for one hour and then dissolved in 35 ml. of methylene chloride. The resulting solution is centrifuged, and the supernatant is decanted from the insoluble solids (mainly tin oxide). A 200-ml. portion of n-pentane is added to the supernatant with stirring whereupon the mixture of n-pentane and supernatant separates into two layers. The top layer of methylene chloride-pentane solution is decanted, leaving a black oily product. The procedure of adding methylene chloride, centrifuging and adding n-pentane to the supernatant is repeated several times to yield 7.1 g. of black gum. From the supernatant solution, 3.0 g. of dibromobis(tetracarbonylcobalt)tin(IV), and 1.3 g. of bromotris(tetracarbonylcobalt)tin(IV), known compounds, are obtained.

The black gum exhibits the following characteristics:

Analysis:

|  | Percent | | | | |
| --- | --- | --- | --- | --- | --- |
|  | Br | Sn | Co | C | H |
| Calculated for: | | | | | |
| {Br$_3$(THF)Sn[Co(CO)$_4$]} | 39.86 | 19.73 | 9.80 | 15.98 | 1.33 |
| {Br$_2$(THF)Sn[Co(CO)$_4$]$_2$} | 23.08 | 17.14 | 17.02 | 20.81 | 1.16 |
| {Br(THF)Sn[Co(CO)$_4$]$_3$} | 10.20 | 15.15 | 22.56 | 24.53 | 1.02 |
| Found | 25.9 | 17.9 | 16.2 | 17.1 | 2.05 |

Solubility: Soluble in methylene chloride and insoluble in n-pentane

AgNO$_3$ in CH$_3$OH:
  Br$_2$Sn[Co(CO)$_4$]$_2$—Precipitate
  BrSn[Co(CO)$_4$]$_3$—Precipitate
  Br$_3$Sn[Co(Co)$_4$]—Precipitate
  Gum—No precipitate I.R.: Carbonyl stretching hands at 2100 (s.) and 2015 (s.) cm.$^{-1}$ Volatility: Non-volatile at 50° C. and 10$^{-3}$ cm. Hg

| Mössbauer data | Isomer shift,[a] mm./sec. | Quadrapole splitting, mm./sec. |
| --- | --- | --- |
| Br$_2$Sn[Co(CO)$_4$]$_2$ | 1.84±.01 | 1.43±.01 |
| Sn[Co(CO)$_4$]$_4$ | 2.07±.01 |  |
| SnBr$_4$ | 1.17±.01 |  |
| (CH$_3$)$_3$SnBr | 1.09±.01 | 3.37±.01 |
| Gum | 1.93±.01 | 1.81±.01 |

[a] Relative location from BaSnO$_3$ source.

The above characteristics indicate a material consisting essentially of a mixture of tin-cobalt carbonyl moieties having the empirical formulas: {Br$_2$(THF)Sn[Co(CO)$_4$]$_2$} and {Br$_3$(THF)Sn[Co(CO)$_4$]} wherein there are tin-cobalt bonds and cobalt-carbonyl bonds and substantially all bromine atoms are inert to attack by Ag$^+$.

A 0.31-g. portion of the black gum reaction product of Run No. 1-1 and 4.5 g. of norbornadiene are charged at room temperature to a flask equipped with a condenser. After replacing air in the system with nitrogen, the contents of the flask are heated slightly and a violent reaction occurs immediately. After stirring for about 10 minutes, unreacted norbornadiene is removed by evacuating the flask leaving a black solid (98% conversion) which, excluding decomposed catalyst, is shown by gas chromatography to contain 99 percent Binor-S and 1 percent other known dimers or norbornadiene. The Binor-S is purified by dissolving the black solid in methylene chloride, passing the resultant solution through an alumina column, adding an equivalent amount of acetone, cooling and then filtering white crystals of Binor-S.

A 0.2-g. portion of the gum of Run No. 1-1 dissolved in 5 ml. of methylene cholride is charged to a 75 ml. Parr bomb. The contents are cooled to liquid nitrogen temperature (~—196° C.) and the bomb is air evacuated with a mechanical pump. A 4-g. portion of allene is charged to the bomb at ~—196° C. which is then heated at 90° C. with shaking for one hour. The unreacted gas is evacuated and the polymer product is removed from the bomb. The resulting polyallene is a rubber-like solid which is not soluble in most organic solvents.

By following the foregoing procedure except that 0.2 g. of the gum of Run No. 1-1 is dissolved in 15 ml. of methylene chloride, a polyallene is produced which is soluble in boiling p-xylene and which can be shaped into a film. Polymerization of butadiene is carried out in a similar manner.

Two additional runs (Run Nos. 1-2 and 1-3) for preparation of bromine-containing gums are made essentially according to the procedure described for Run No. 1-1 except that in Run No. 1-2, 21.6 g. (77.5 mmoles) of tin dibromide is mixed with 17.7 g. (51.7 mmoles) of octacarbonyldicobalt in 180 ml. of THF and in Run No. 1-3, 5.15 g. (18.8 mmoles) of tin dibromide and 13.22 g. (38.6 mmoles) of octacarbonyldicobalt are mixed in 125 ml. of THF.

In Run No. 1-2, a black gum is isolated which has essentially the same general physical and chemical characteristics as that isolated in Run No. 1-1. In Run No. 1-3 a black solid is obtained. In spite of the difference in physical appearance, the products of Run Nos. 1-2 and 1-3 are catalysts for the dimerization of norbornadiene and polymerization of allene.

EXAMPLE 2

Three runs (Run Nos. 2-1, 2-2 and 2-3) are carried out by charging tin dichloride, octacarbonyldicobalt and tetrahydrofuran (THF) to a reactor under nitrogen atmosphere and stirring the reaction mixture at 25° C. for 30 minutes. Black gums are recovered from the reaction mixtures using the procedure described in Example 1.

The characteristics of the resulting gums are as follows:

| | Charge | | | | |
| --- | --- | --- | --- | --- | --- |
| | SnCl$_2$ | | Co$_2$(CO)$_8$ | | |
| | Grams | Mmoles | Grams | Moles | THF, ml. |
| Run No.: | | | | | |
| 2-1 | 7.55 | 40 | 6.8 | 20 | 50 |
| 2-2 | 3.78 | 20 | 6.8 | 20 | 50 |
| 2-3 | 1.89 | 10 | 6.8 | 20 | 50 |

Analysis:

| | Percent | | | | |
| --- | --- | --- | --- | --- | --- |
| | Cl | Sn | Co | C | H |
| Calculated for: | | | | | |
| Cl$_3$(THF)Sn[Co(C-)$_4$] | 22.72 | 25.35 | 12.59 | 20.53 | 1.71 |
| Cl$_2$(THF)Sn[Co(CO)$_4$]$_2$ | 11.75 | 19.66 | 19.52 | 23.88 | 1.33 |
| Cl(THF)Sn[Co(CO)$_4$]$_3$ | 4.08 | 16.06 | 23.92 | 26.00 | 1.08 |
| Found for: | | | | | |
| Run No. 2-1 | *ND | ND | ND | 20.7 | 2.05 |
| Run No. 2-2 | 14.0 | 21.9 | 18.5 | 19.7 | 2.0 |
| Run Nl. 2-3 | ND | ND | ND | 22.6 | 2.25 |

*ND=Not determined.

Solubility: Soluble in methylene chloride and insoluble in n-petane,

AgNO$_3$ in CH$_3$OH:
  Cl$_3$Sn[Co(CO)$_4$]—Precipitate
  Cl$_2$Sn[Co(CO)$_4$]$_2$—Precipitate
  ClSn[Co(CO)$_4$]$_3$—Precipitate
  Run Nos. 2-1, 2-2 and 2-3—No precipitate
Precipitate indicates formation of AgCl and $$(NO_3)_{4-n}Sn[Co(CO)_4]_n$$

I.R.: Carbonyl stretching bonds at 2100 cm.$^{-1}$ (s.) and 2020 cm.$^{-1}$ (s.)

Volatility: Non-volatile even at 50° C. under vacuum of 10$^{-3}$ cm. Hg

| Mössbauer data | Isomer shift,[a] mm./sec. | Quadropole splitting, mm./sec. |
|---|---|---|
| $Cl_2Sn[Co(CO)_4]_2$ | 1.79±.01 | 1.47±.01 |
| $ClSn[Co(CO)_4]_3$ | 1.93±.01 | 1.04±.01 |
| $(CH_3)_3SnCl$ | 1.43±.01 | 3.34±.01 |
| $SnCl_4$ | 0.33±.01 | 0.0 |
| Run No. 2-1 | 1.86±.02 | 1.80±.01 |
| Run No. 2-2 | 1.91±.02 | 1.70±.02 |
| Run No. 2-3 | 2.06±.02 | 1.49±.02 |

[a] Relative location from $BaSnO_3$ source.

The above characteristics indicate Run Nos. 2-1, 2-2 and 2-3 to be mixtures of metal-cobalt carbonyl moieties having the empirical formulas:

$$\{Cl_2(THF)Sn[Co(CO)_4]_2\}$$

and $\{Cl_3(THF)Sn[Co(CO)_4]\}$. Such characteristics also indicate that each gum has tin-cobalt bonds and cobalt carbonyl bonds and that in each gum substantially all chlorine atoms are inert to attack by $Ag^+$. It is found that slight changes in reaction conditions or in proportions of starting ingredients yield complexes giving different Mössbauer values. However, all such complexes are effective catalysts for the purposes of this invention.

Following a procedure similar to that described in Example 1, the gums of Run Nos. 2-1, 2-2 and 2-3 are employed as catalysts for the dimerization of norbornadiene. Each gum catalyzes the dimerization of norbornadiene to Binor-S in better than 95 percent yield. These gums also catalyze the polymerization of allene under conditions described for allene polymerizaiton in Example 1.

EXAMPLE 3

A 3.1-g. portion (9 mmoles) of purified octacarbonyldicobalt is stirred with 5.0 g. (18 mmoles) of tin dibromine in 150 ml. of diethyl ether under nitrogen atomsphere for 1 hour at 25° C. Excess diethyl ether ($Et_2O$) is removed with a flow of carbon monoxide through the reaction vessel. The residue is treated according to the procedure of Example 1 whereby 5.3 g. of a black gum is isolated. This gum is found to have physical and chemical characteristics similar to the gum of Example 1. However, this gum which has tin-cobalt-carbonyl moiety represented by the empirical formula $$\{Br_{2-3}(Et_2O)Sn[Co(CO)_4]_{1-2}\}$$

exhibits greater activity in catalyzing the stereospecific dimerization of norbornadiene to Binor-S than do the aforementioned gums.

Following procedures similar to the foregoing, gums having tin-cobalt carbonyl moiety are prepared using in separate runs methanol and acetone as the polar organic solvent. In both instances the resulting gums are effective catalysts in the stereospecific dimerization of norbornadiene to Binor-S.

For purposes of comparison and to further define the invention, a run is carried out essentially according to the foregoing procedure except that the reaction of purified octacarbonyldicobalt and tin dibromide is effected in benzene. While dibromobis(tetracarbonylcobalt)tin(IV) and bromotris(tetracarbonylcobalt)tin(IV) are recovered, no gum-like material is produced.

EXAMPLE 4

In this example, 2.56-g. portions (15 mmoles) of tin chloridefluoride and tin diiodide are mixed in separate runs with 2.6-g. portions (7.5 mmoles) of purified octacarbonyldicobalt in 125 ml. of tetrahydrofuran under nitrogen atmosphere for 30 minutes at 25° C. Following the procedure of Example 1, gum is recovered in the reaction mixture of each run. Both gums catalyze the stereospecific dimerization of norbornadiene to Binor-S and the polymerization of allene and butadiene.

Following the general procedure of Example 1, several runs are carried out wherein the following metal compounds: silicon tetrabromide, germanium diiodide, gallium trichloride, indium(III) nitrate, thallium(III) acetylacetonate, lead(II) sulfate, lead(II) nitrite and tin(II) nitrate are reacted with purified octacarbonyldicobalt in the following polar organic solvents: isopropanol, ethylene glycol, ethylene glycol dimethyl ether, acetaldehyde, methyl mercaptan, diethyl sulfide, trimethyl amine, aniline, pyridine, dimethylformamide, acetic acid and acetic anhydride. In each run a complex having multinuclear, metal-cobalt carbonyl moiety, as described hereinbefore, is produced. Each complex is an effective catalyst for the dimerization of norbornadiene and in the polymerization of allene.

What is claimed is:

1. A method for the polymerization of an olefin selected from the group consisting of allene and butadiene which comprises contacting the olefin with a complex in a catalytic amount in the range from about 0.01 to about 100 parts by weight of a complex per 100 parts by weight of olefin under pressure in the range from atmospheric to 100 atmospheres and a temperature in the range from about 0° to about 100° C., said complex having multinuclear metal-cobalt carbonyl moiety represented by the empirical formula, $\{X_{y-n}(A)_zM[Co(CO)_4]_n\}$, wherein X is a ligand with the proviso that at least one ligand represented by X is chloro, bromo, iodo, nitro, nitrato, sulfato or acetylacetonato, A is a polar organic solvent molecule having at least one unshared pair of electrons per molecule, M is a six coordinate metal of Group 3a and 4a of the Periodic Table of Elements, $y$ is 3 when M is a 3a metal and 4 when M is a 4a metal, $z$ is an average number from about 0.5 to about 1, and $n$ is 1 or 2 when M is a 3a metal and 1, 2 or 3 when M is a 4a metal.

2. The method of claim 1 wherein the polymerization is effected in an inert atmosphere at temperature in the range from about 40° to about 80° C. and in the presence of from about 1 to about 10 parts by weight of complex per 100 parts by weight of olefin.

3. The method of claim 1 wherein polymerization is carried out in the presence of methylene chloride.

4. The method of claim 1 wherein M is selected from the group consisting of tin, silicon, germanium, gallium, indium, thallium and lead and A is selected from the group consisting of alcohol, glycol, ether, ketone, aldehyde, thiol, thioether, amide, amine, carboxylic acid and anhydride.

5. The method of claim 1 wherein A is selected from the group consisting of isopropanol, ethylene glycol, acetaldehyde, methylmercaptan, tetrahydrofuran, diethyl sulfide, trimethyl amine, aniline, pyridine, dimethylformamide, and acetic acid.

References Cited

UNITED STATES PATENTS 3,679,722   7/1972   Tsai et al. _____ 260—94.3 X

JOSEPH L. SCHOFER, Primary Examiner

W. F. HAMROCK, Assistant Examiner

U.S. Cl. X.R.

252—431; 260—429, 680

UNITED STATES PATENT OFFICE
CERTIFICATE OF CORRECTION

Patent No. 3,780,010      Dated December 18, 1973

Inventor(s) James H. Tsai and Glenn H. Anderson

It is certified that error appears in the above-identified patent and that said Letters Patent are hereby corrected as shown below:

Column 1, line 25, change the period (.) to a comma (,) and insert the words --now USP 3,679,722.--.

Column 1, line 64, the word "steroregular" should be --stereoregular--.

Column 2, line 39, the word "atoms(s)" should be --atom(s)--.

Column 3, line 56, there should be a space between the word "inventionare" so that it reads --invention are--.

Column 4, line 59, the word "oleolefin" should be --of olefin--.

Column 5, line 39, the word "hands" should be --bands--.

Column 5, line 73, the word "cholride" should be --chloride--.

Column 6, line 54 in the Table, the last part of the formula "Sn[Co(C-)$_4$]" should be --Sn[Co(CO)$_4$]--.

Column 6, line 63, the word "n-petane" should be --n-pentane--.

Column 7, line 29, the word "polymerizaiton" should be --polymerization--.

Column 7, line 35, the word "mine" should be --mide--.

Signed and sealed this 25th day of June 1974.

(SEAL)
Attest:

EDWARD M. FLETCHER, JR.
Attesting Officer

C. MARSHALL DANN
Commissioner of Patents